US010719179B2

(12) United States Patent
Glad

(10) Patent No.: US 10,719,179 B2
(45) Date of Patent: Jul. 21, 2020

(54) CAPACITIVE SENSOR ENABLING ROW AND COLUMN NODE ALIGNMENT WHEN DISPOSED ON A THREE-DIMENSIONAL OBJECT

(71) Applicant: CIRQUE CORPORATION, Salt Lake City, UT (US)

(72) Inventor: Paul Glad, Taylorsville, UT (US)

(73) Assignee: Cirque Corporation, Sandy, UT (US)

( * ) Notice: Subject to any disclaimer, the term of this patent is extended or adjusted under 35 U.S.C. 154(b) by 72 days.

(21) Appl. No.: 15/982,429

(22) Filed: May 17, 2018

(65) Prior Publication Data

US 2018/0335871 A1 Nov. 22, 2018

Related U.S. Application Data

(60) Provisional application No. 62/507,977, filed on May 18, 2017.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04102* (2013.01); *G06F 2203/04103* (2013.01)

(58) Field of Classification Search
CPC .................. G06F 3/044; G06F 3/0416; G06F 2203/04103; G06F 2203/04102
See application file for complete search history.

(56) References Cited

U.S. PATENT DOCUMENTS

2010/0242274 A1\* 9/2010 Rosenfeld ........... G06F 3/03543
29/848

\* cited by examiner

*Primary Examiner* — Mark W Regn

(57) ABSTRACT

A system and method for manufacturing a planar capacitive touch sensor that can be folded over a three-dimensional object that does not require substantial modification to function, wherein columns and rows of capacitive measurement nodes follow substantially linear designs, and wherein the algorithms used for detection and tracking objects are substantially the same as for a planar touch sensor design.

20 Claims, 11 Drawing Sheets

CAPACITIVE SENSOR ENABLING ROW AND COLUMN NODE ALIGNMENT WHEN DISPOSED ON A THREE-DIMENSIONAL OBJECT

BACKGROUND OF THE INVENTION

Field of the Invention

This invention relates generally to touch and proximity sensors. More specifically, the invention relates to a system and method for manufacturing a planar capacitive sensor that when disposed over a three-dimensional object such as a hemispherical object or a globular object, the rows and columns will align sufficient to enable detection and tracking of objects without modification of the algorithms used if the object were planar.

Description of Related Art

There are several designs for touch sensors which may be used in the present invention. It is useful to examine the underlying technology of the touch sensors to better understand how any capacitance sensitive touchpad may take advantage of the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12 and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven.

In other words, the electrode on one side of the group is added, while the electrode on the opposite side of the group is no longer driven. The new group is then driven by the P, N (positive-negative) generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24.

Although the CIRQUE® touch sensor described above uses a grid of X and Y electrodes 12, 14 and a separate and single sense electrode 16, the sense electrode may also be the X or Y electrodes 12, 14 by using multiplexing.

It is difficult to create a capacitive sensor that is easily disposed over three dimensional objects such as a hemisphere or a globe. One reason may be that it is difficult to find a shape that can be manufactured in a planar design, but then folded and still function as a touch sensor when disposed over a three-dimensional shape.

A second reason may be that the software that executes algorithms that determine if objects are present on a touch sensor is typically a proprietary design that will only function for the specific touch sensor.

Accordingly, it would be an advantage over the prior art to provide a planar shape for a capacitive touch sensor that may be manufactured in a planar design and use software for detection and tracking of objects that does not require substantial modification from existing rectangular touch sensor design.

BRIEF SUMMARY OF THE INVENTION

In a first embodiment, the present invention is a system and method for manufacturing a capacitive touch sensor in a planar form that may then be folded over a three-dimensional object, wherein the touch sensor does not require substantial modification to function, wherein columns and rows of capacitive measurement nodes follow substantially linear designs, and wherein the algorithms used for detection and tracking of objects are substantially the same as for a planar touch sensor design.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention and should not be viewed as narrowing the claims which follow.

The first embodiment of the present invention is both a system and method for providing a planar capacitive touch sensor that may be folded over a three-dimensional object so as to conform to the shape of the three-dimensional object. Such non-planar touch sensor designs typically require a unique set of algorithms for detecting and tracking objects thereon because there may be no alignment of capacitive measurement nodes in columns and rows.

However, the first embodiment of the present invention is a design for a planar touch sensor such that when the planar touch sensor is disposed over the three-dimensional shape, the columns and rows of the touch sensor respond as if they are substantially linear. This substantial linearity may be defined as enabling touch sensor algorithms that are used for planar rectangular touch sensors may also be used without substantial modification for the three-dimensional design of the touch sensor.

Figure 1:
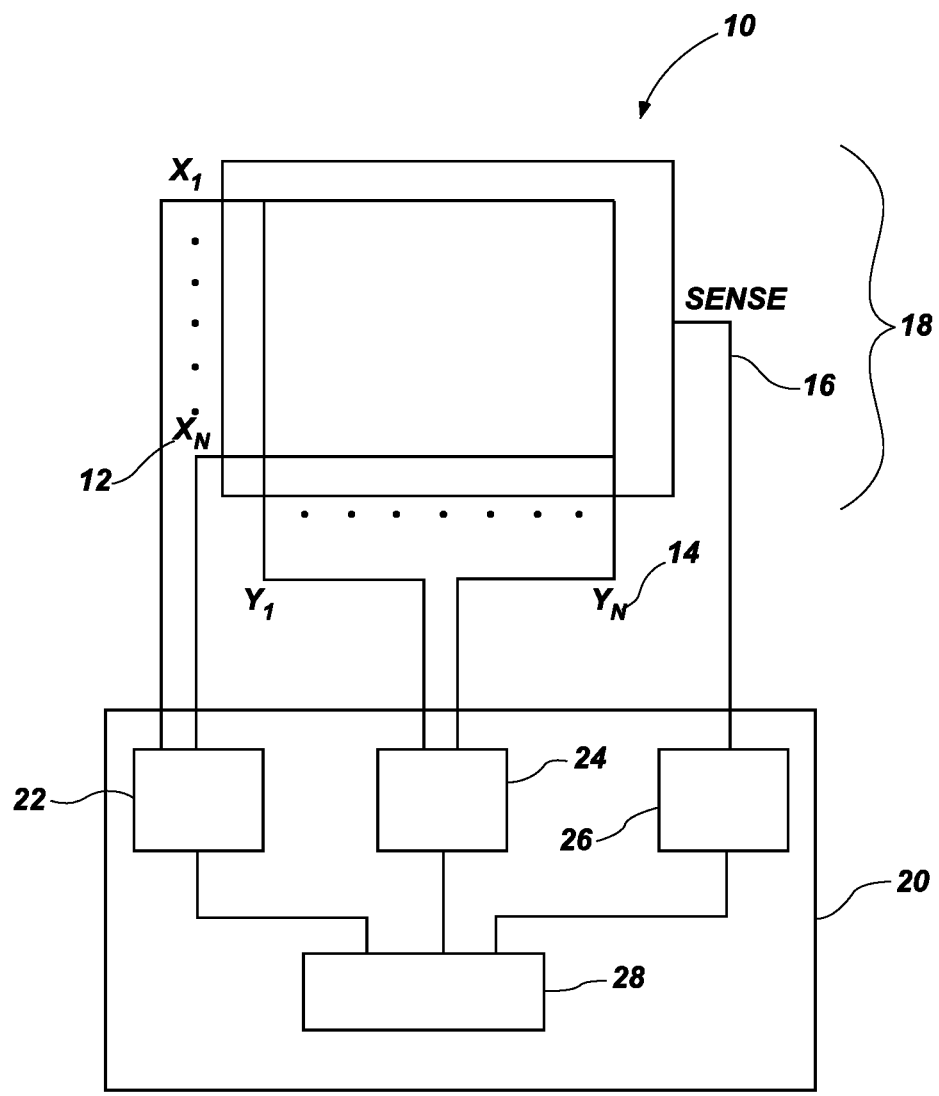
FIG. 1 is a block diagram that illustrates a prior art design of a touch sensor that may function in the present invention.
Figure 2A:
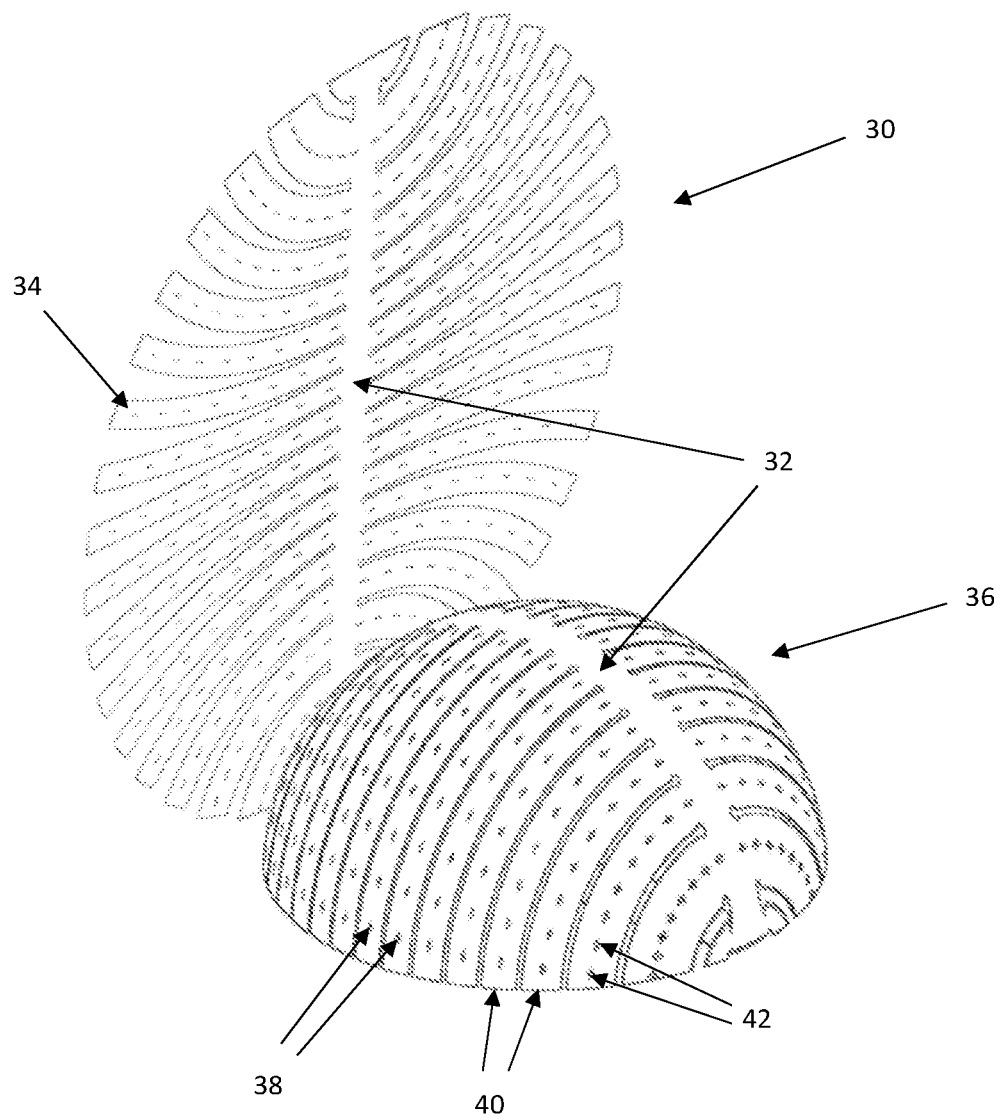
FIG. 2A is a perspective view of two views of a first embodiment of the present invention.

FIG. 2A is a perspective view of a first embodiment of the invention. Two images are shown of the same touch sensor in FIG. 2. The first image is a planar touch sensor 30 that is manufactured on a planar substrate. The second image is the planar touch sensor after it is disposed on a three-dimensional hemispherical object (not shown) to thereby form a shaped touch sensor 36 after it has been cut from the planar substrate and disposed over a three-dimensional object. In this case, the three-dimensional object is a hemispherical shape.

It should be understood that when the planar touch sensor 30 is cut from a planar substrate, the cut is made along the outline of the touch sensor. In addition, the substrate for all of the embodiments of the invention may be a flexible material such as MYLAR™ or Polyethylene terephthalate (PET) as known to those skilled in the art. What is important is that the material used for the substrate is capable of flexing such it may conform to the curvature of a three-dimensional object without leaving gaps or making creases in the substrate material.

The planar and shaped touch sensors 30, 36 may include a central spine 32 and a plurality of touch sensor branches 34. One feature of the planar touch sensor 30 is that the touch sensor branches 34 are seen having a curved shape when shown in the planar configuration. The curvature of the touch sensor branches 34 is necessary in order for the shaped touch sensor 36 to have the proper spacing between the touch sensor branches 34. It is noted that the spacing between the touch sensor branches 34 changes and the spacing is wider the further the touch sensor branches are from the central spine 32.

However, when the planar touch sensor 30 is bent so as to conform to the surface of the three-dimensional object, the spacing between the touch sensor branches 34 is changed. The shaped touch sensor 36 shows even spacing between the touch sensor branches 34 when disposed around a curved portion of the hemispherical object. The even spacing of the touch sensor branches 34 provides even spacing between capacitive measurement nodes 38 shown as dots on the touch sensor branches.

The central spine 32 may contain a main buss electrical connection distribution leading to individual touch sensor branches 34 with the capacitive measurement nodes positioned at regular intervals. When the planar touch sensor 30 is formed into the final shaped touch sensor 36, it may conform to that shape without overlap or creases.

A naming convention may be selected by observing that each arm of the touch sensor branches 34 may be described as a row 40 of capacitive measurement nodes 38 of the touch sensors 30, 36. Consequently, the different touch sensor branches 34 thus form columns 42 of capacitive measurement nodes 38 of the touch sensors 30, 36.

Figure 2B:
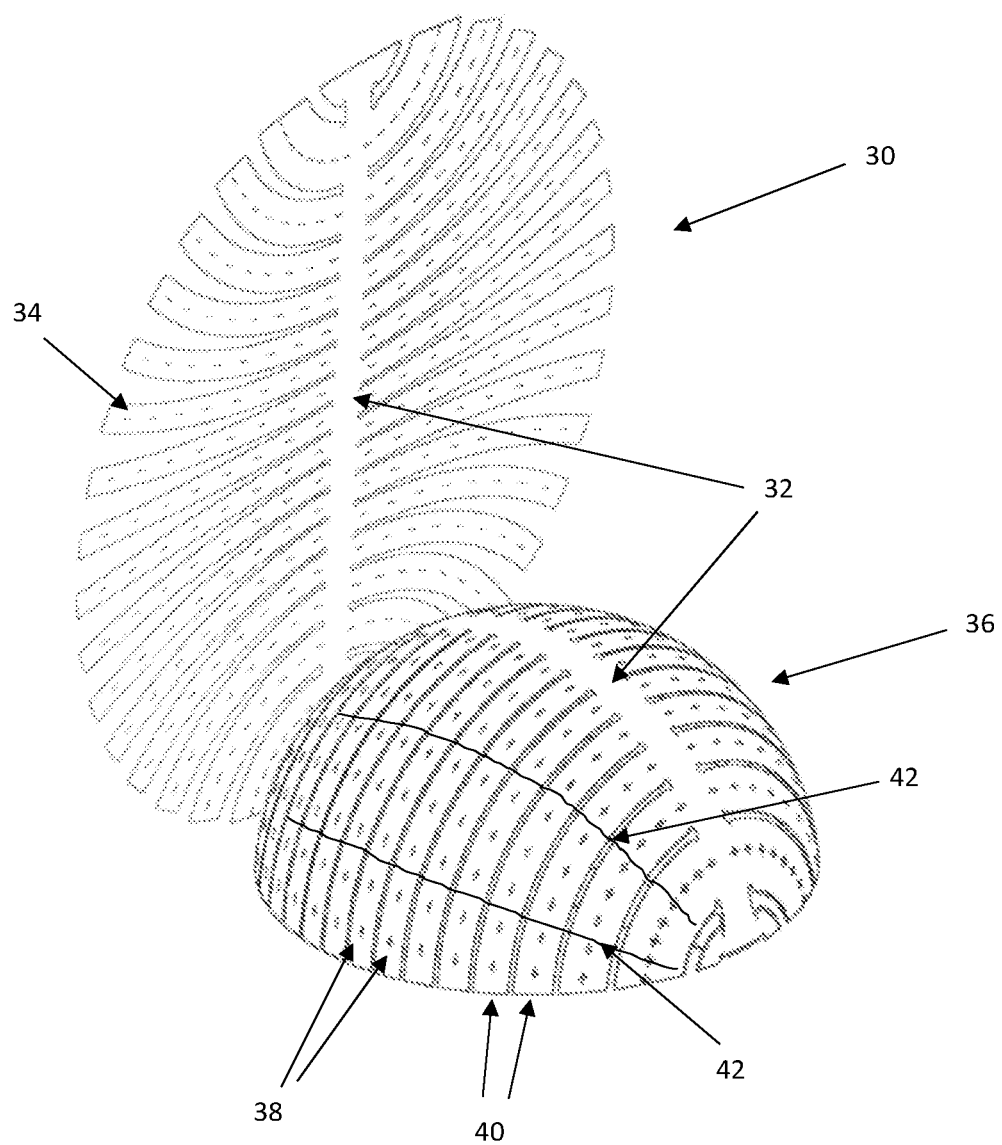
FIG. 2B is a perspective view of two views of a first embodiment of the present invention, with the column and rows illustrated.

FIG. 2B is provided to illustrate two columns 42 of capacitive measurement nodes 38 on the touch sensor branches 34 with the columns drawn through the capacitive measurement nodes to illustrate their location. One aspect of the first embodiment is that the spacing between the rows 40 remains constant, but the spacing between the columns 42 does not. The columns 42 are arranged like longitudinal lines on a globe, where the ends of the longitudinal lines get closer near the ends, and farthest apart in the middle of the lines. However, the columns 42 are always linear despite the curvature of the hemispherical object under the shaped touch sensor 36.

It may be a significant achievement to be able to use substantially the same detection and tracking algorithms of the prior art because of the significant cost savings in development. In other words, if a different touch sensor detection and tracking algorithm had to be used for each three-dimensional shape, the cost of making a touch sensor for each three-dimensional shape would be prohibitive.

Thus, one aspect of the first embodiment may be that the design of the shaped touch sensor 36 may always have the desired linearity in rows 40 and columns 42 only after it is disposed onto the surface of the three-dimensional object that it is designed to fit. Consequently, existing detection and tracking touch sensor algorithms for planar touch sensors may be used without substantial modification.

In this document, the phrase "without substantial modification" for the detection and tracking touch sensor algorithms may be defined as only having to provide offsets in the detection and tracking algorithms to compensate for the uneven spacing between capacitive measurement nodes 38 in the rows 40, and not for the fact that the columns 42 and rows are substantially linear.

Figure 3:
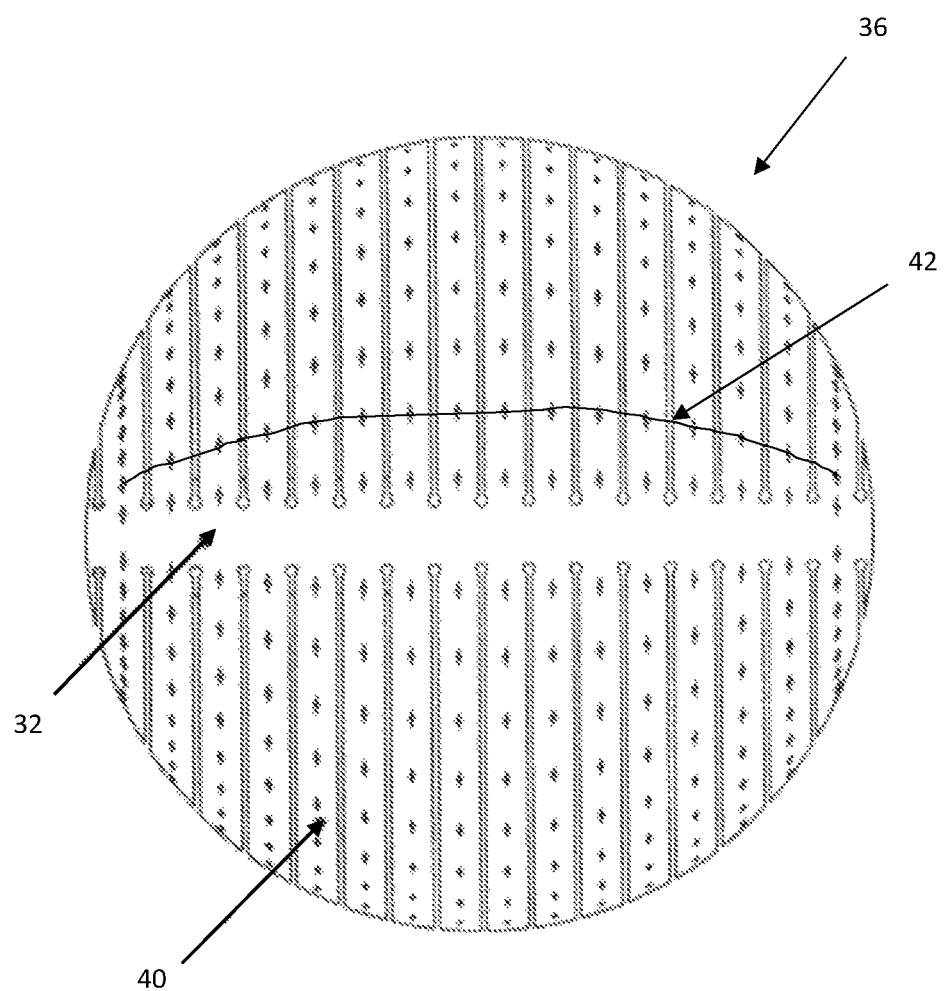
FIG. 3 is a top view of the first embodiment of the present invention.

FIG. 3 is a top view of the shaped touch sensor 36. This view shows the central spine 32 and also makes it easier to see the even spacing of the rows 40 and the arcuate nature of the columns 42.

Figure 4:
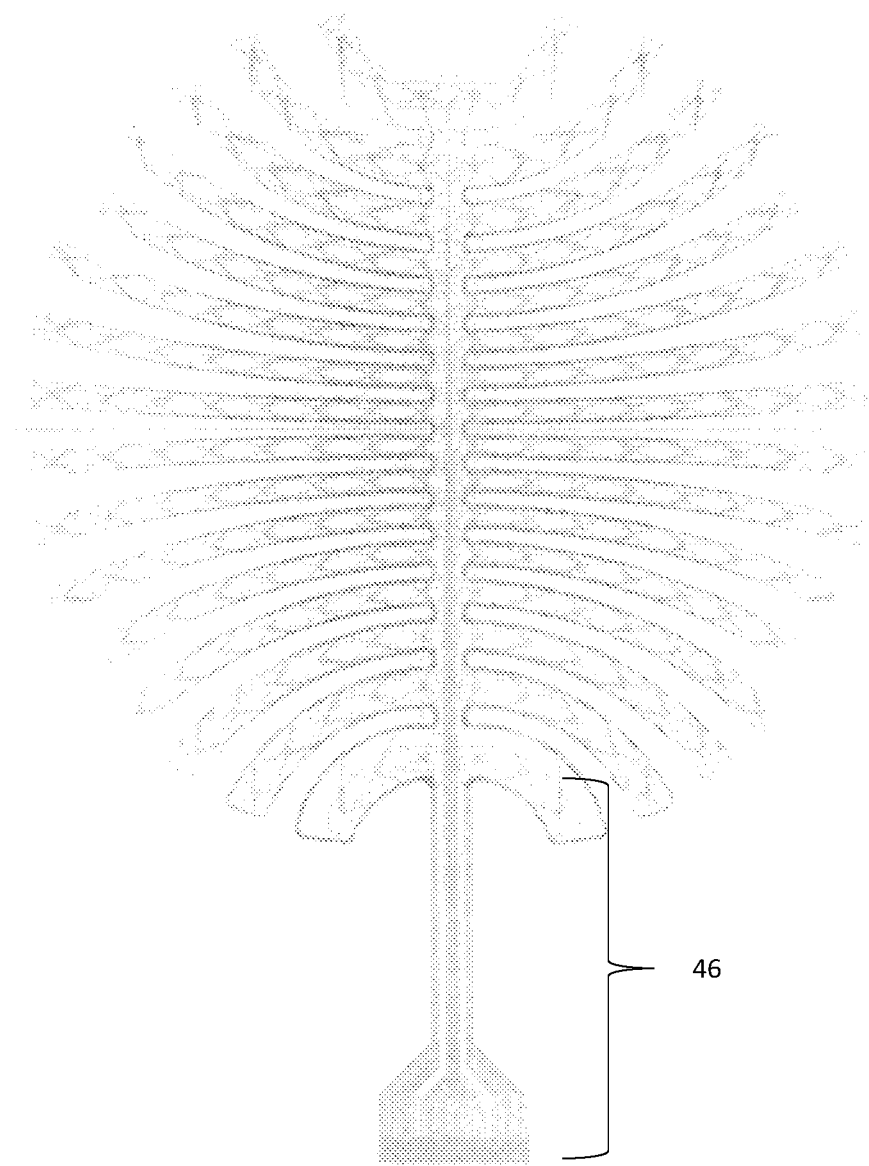
FIG. 4 is a top view of the first embodiment of the present invention showing a tail connector.

FIG. 4 is a top view of the planar touch sensor 30 of the first embodiment. However, a tail connector 46 is now shown as coupled to the planar touch sensor 30. The tail connector is a connection point of all row and column electrodes to the planar touch sensor 30.

Figure 5:
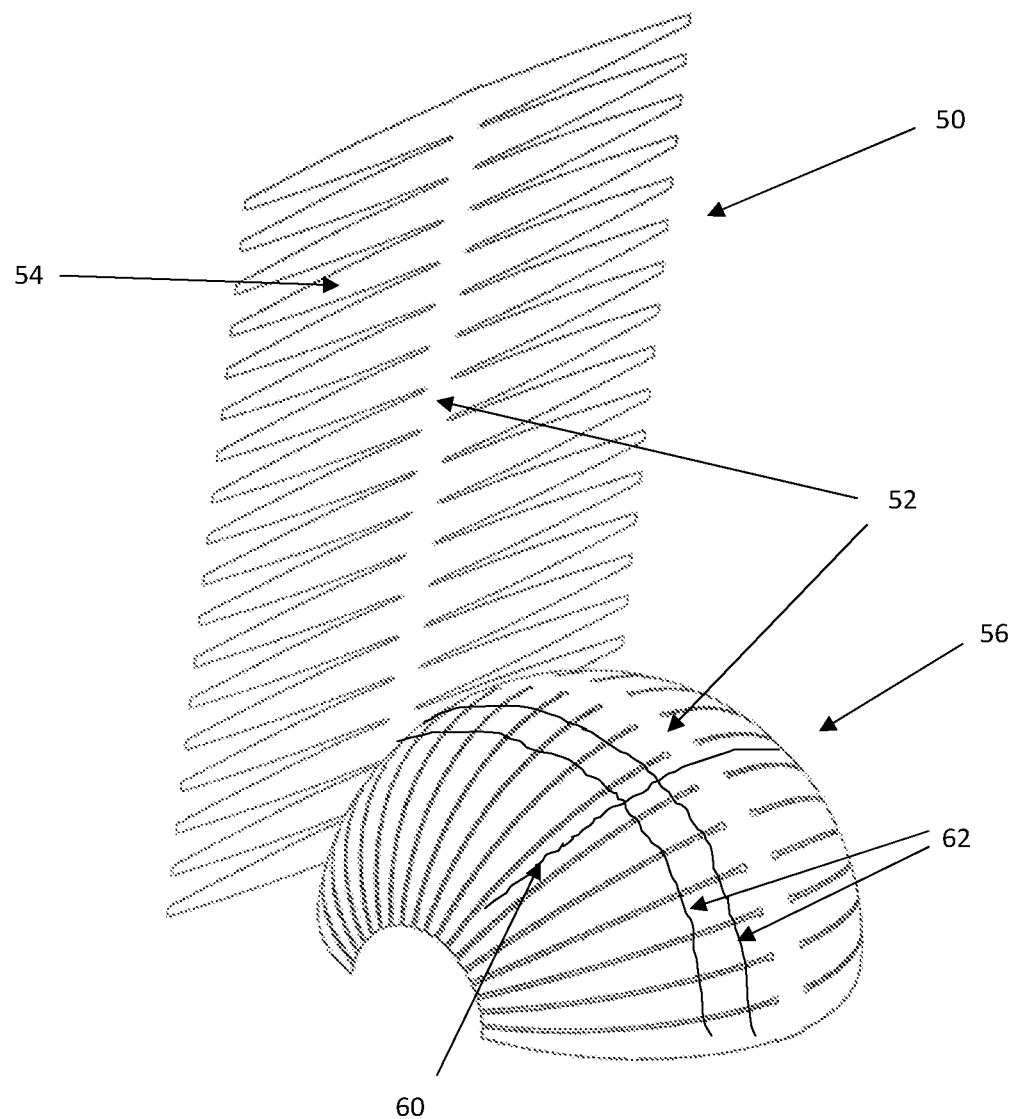
FIG. 5 is a perspective view of a second embodiment of the present invention.

FIG. 5 is a perspective view of a second embodiment of the invention. Two images of the same touch sensor are shown in FIG. 5. The first image is a planar touch sensor 50 that is manufactured on a planar substrate. The second image is a shaped touch sensor 56 after it has been cut from the planar substrate and disposed over a three-dimensional object. In this case, the three-dimensional object is still a hemispherical shape just as in FIGS. 2A and 2B.

It should be understood that when the planar touch sensor 50 is cut from a substrate, the cut is made along the outline of the touch sensor. The cut must conform to the outline of the touch sensor branches 54 so that the touch sensor branches may be brought together when placed over the three-dimensional object.

The planar and shaped touch sensors 50, 56 include a central spine 52 and a plurality of touch sensor branches 54. One feature of the planar touch sensor 50 is that the touch sensor branches 54 are seen having a linear shape when shown in the planar configuration. However, unlike FIGS. 2A and 2B where the touch sensor branches 34 were of equal width but were all curved different amounts, the touch sensor branches 54 of FIG. 3 are narrow at the ends and widest at the middle and are of uniform shape. The shape of the touch sensor branches 54 is necessary in order for the shaped touch sensor 56 to have the proper spacing between the touch sensor branches. It is noted that the spacing between the touch sensor branches 54 changes and the spacing is wider the further the touch sensor branches are from the central spine 52.

When the planar touch sensor 50 is bent so as to conform to the three-dimensional hemispherical object, the spacing between the touch sensor branches 54 is again changed as in the first embodiment. The shaped touch sensor 56 shows even spacing between the touch sensor branches 54 when disposed around the three-dimensional hemispherical object.

A naming convention may be selected by observing that each arm of the touch sensor branches 54 may be described as a row 60 of capacitive measurement nodes of the touch sensors 50, 56. Consequently, the different touch sensor branches 44 thus form columns 62 of capacitive measurement nodes of the touch sensors 50, 56.

However, it noted that instead of even spacing between all of the rows 40 and uneven spacing between the columns 42 as in the first embodiment, the rows 60 have uneven spacing and the columns 62 are evenly spaced in the second embodiment. Thus, capacitive measurement nodes in the second embodiment are unevenly spaced in the rows and evenly spaced in the columns.

Accordingly, one aspect of the second embodiment may be that the design of the shaped touch sensor 56 may always have the desired linearity in rows 60 and columns 62 only after it is disposed onto the surface of the three-dimensional hemispherical object that it is designed to fit. Consequently, existing detection and tracking touch sensor algorithms for planar touch sensors may be used without substantial modification.

In this document, the phrase "without substantial modification" for the second embodiment may be defined as only having to provide offsets in the detection and tracking algorithms to compensate for the uneven spacing between capacitive measurement nodes in the rows 60, and not for the fact that the rows and the columns 62 are substantially linear.

Figure 6:
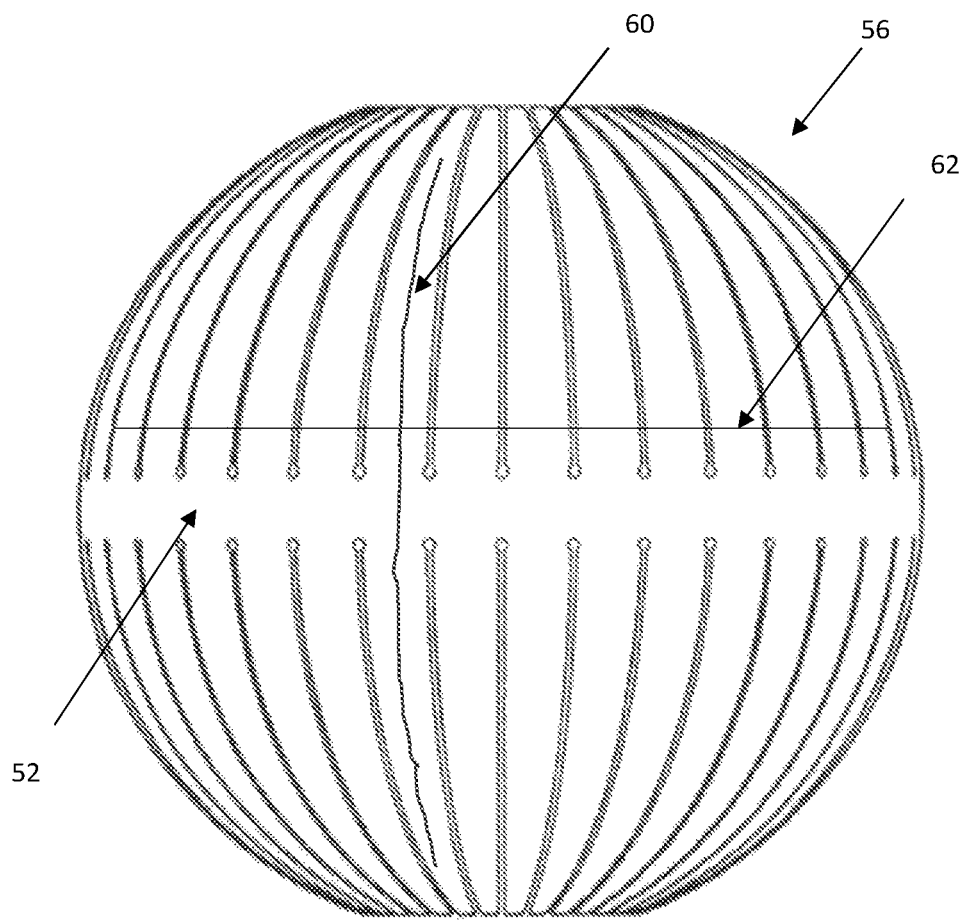
FIG. 6 is a top view of the second embodiment of the present invention.

FIG. 6 is a top view of the shaped touch sensor 56. This view shows the central spine 52 and also makes it easier to see the even spacing of the rows 60 and the arcuate nature of the columns 62.

Figure 7:
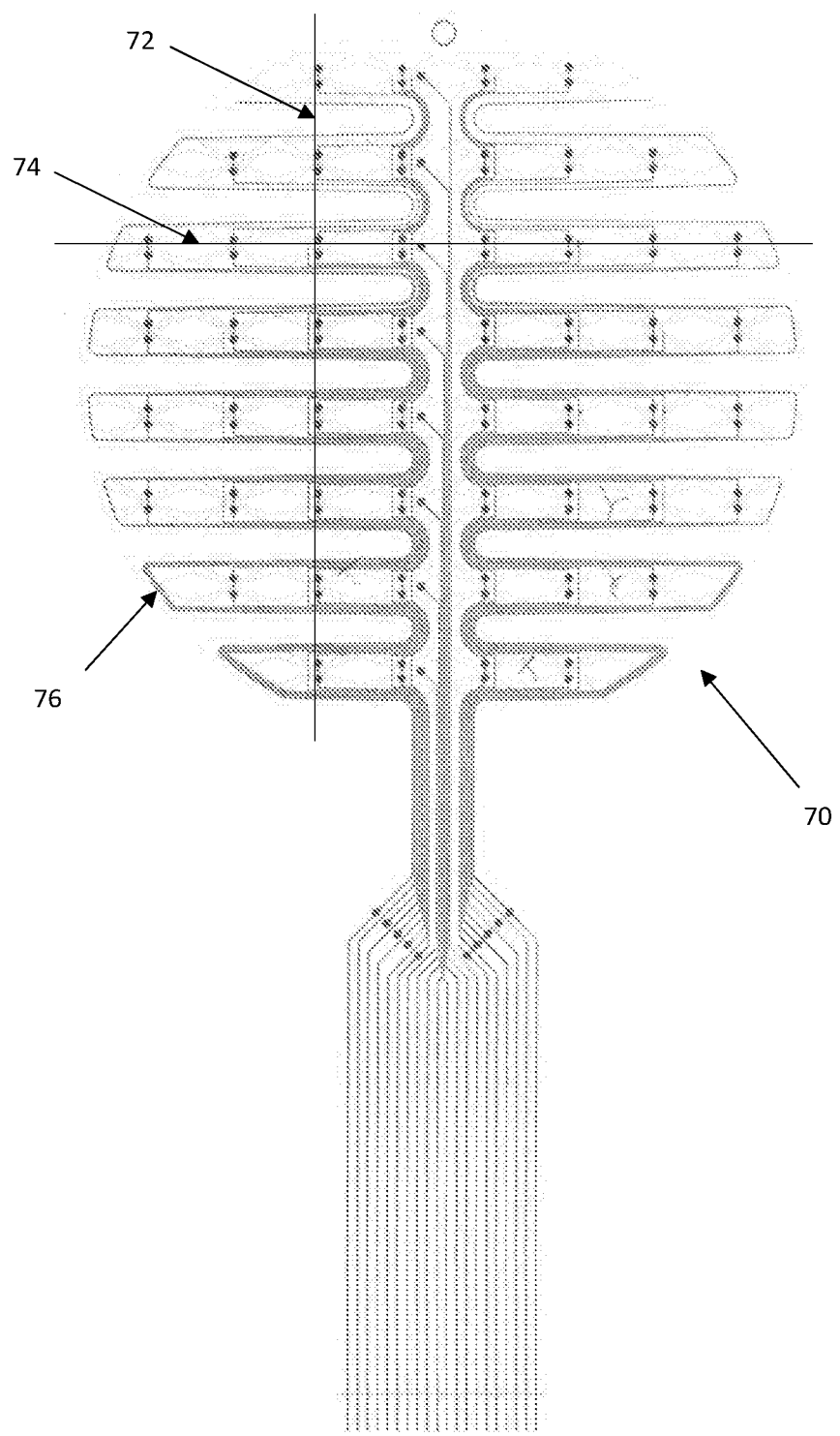
FIG. 7 is a top view of a third embodiment of the present invention.

FIG. 7 is a top view of a third embodiment of the invention. In this third embodiment, a planar touch sensor 70 is shown from a top view. There are several important differences between the planar touch sensor 70 of the third embodiment and the planar touch sensors 30, 50 of the first and second embodiments.

First, both columns 72 and rows 74 are evenly spaced in the planar configuration and in a shaped configuration when the planar touch sensor 70 is disposed around a three-dimensional object. Second, the spacing between the touch sensor branches 76 is much wider than the first or second embodiments. Third, the number of capacitive measurement nodes in the columns 72 and the rows 74 is no longer constant.

The result is that if the planar touch sensor 70 is disposed on a three-dimensional hemispherical object, the columns 72 and rows 74 may both remain evenly spaced, and the spacing between the rows 74 may remain constant. Accordingly, no offsets need to be used for the third embodiment of the invention, and the detection and tracking algorithms are absolutely unmodified.

The new embodiments may not be limited to a single axis curved surface application. Individual sensor elements may also be connected to a common control circuit or cable buss connection and distributed to a common control circuit.

All of the embodiments of the present invention may include a combination of relief apertures, cuts, tabbed sensor elements or slots in the planar and shaped touch sensors that may bend, fold and move such that when a planar touch sensor is applied to a three-dimensional surface, object detection and tracking remain achievable. Separate physical zones may be connected through wires, cables or flex circuit elements. Separate physical zones may also be adjacent to each other and allow a continuous flexible sensor to be bent and connected from one surface to another.

Figure 8:
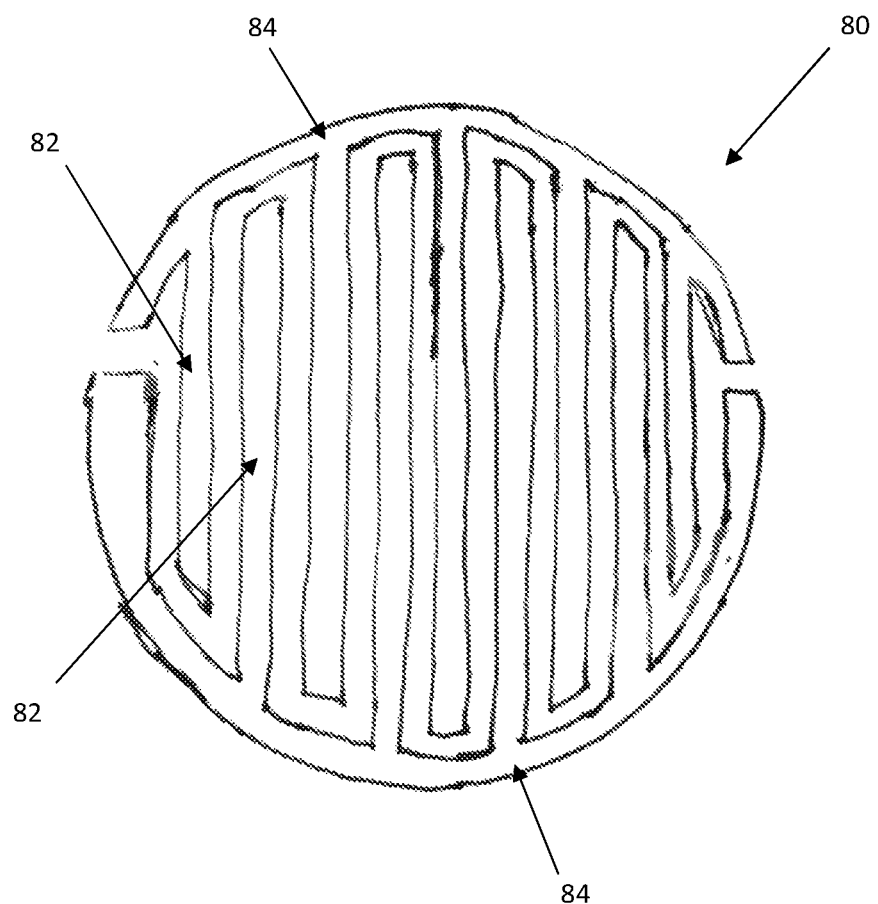
FIG. 8 is a top view of a fourth embodiment of the present invention.

FIG. 8 is a fourth embodiment of the invention. Instead of a central spine, this fourth embodiment may use an opposite approach. FIG. 8 is a top view of a shaped touch sensor 80 that is disposed on a three-dimensional object. The shaped touch sensor 80 may include a plurality of interlocking fingers 82 that may reach towards each other without making contact. This fourth embodiment may be constructed similar to the planar touch sensor 70 in FIG. 7, or like the planar touch sensors 30, 50, with a spine 84 on opposite sides of each other.

Figure 9:
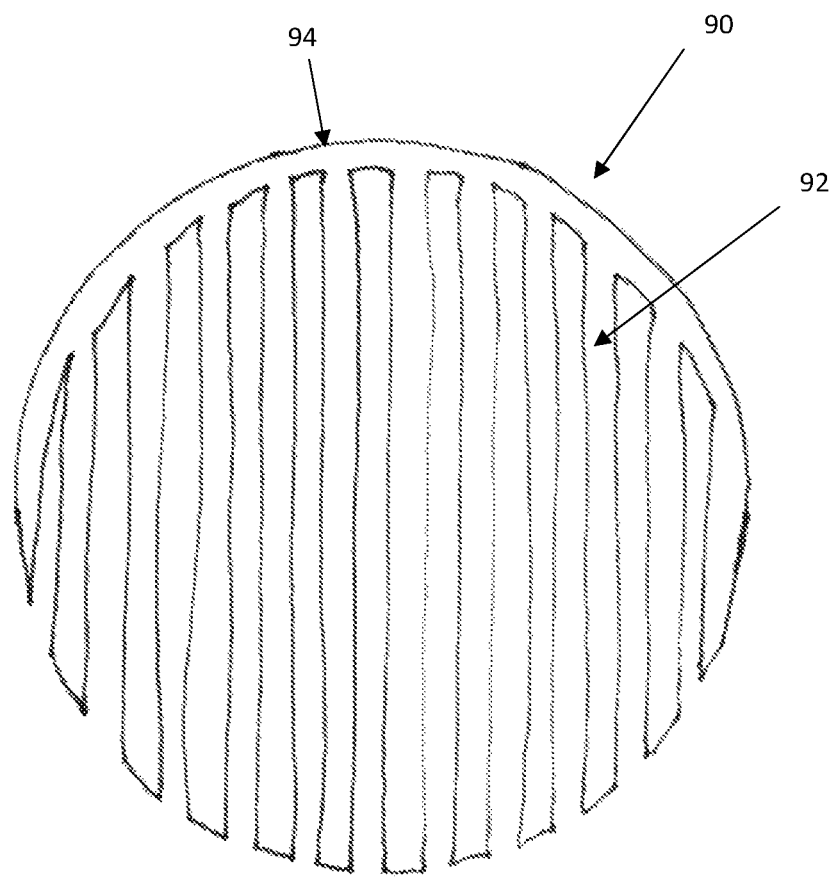
FIG. 9 is a top view of a fifth embodiment of the present invention.

FIG. 9 is a fifth embodiment of the invention. Instead of a central spine, this fifth embodiment may have a spine on one side only of the touch sensor. FIG. 9 is a top view of a shaped touch sensor 90 that is disposed on a three-dimensional object. The shaped touch sensor 90 may include a plurality of fingers 92 that may reach towards the far side of the three-dimensional object and extending from a single spine 94. This fifth embodiment may be constructed similar to the planar touch sensor 70 in FIG. 7, or like the planar touch sensors 30, 50, with a spine 94 on just one side.

Figure 10:
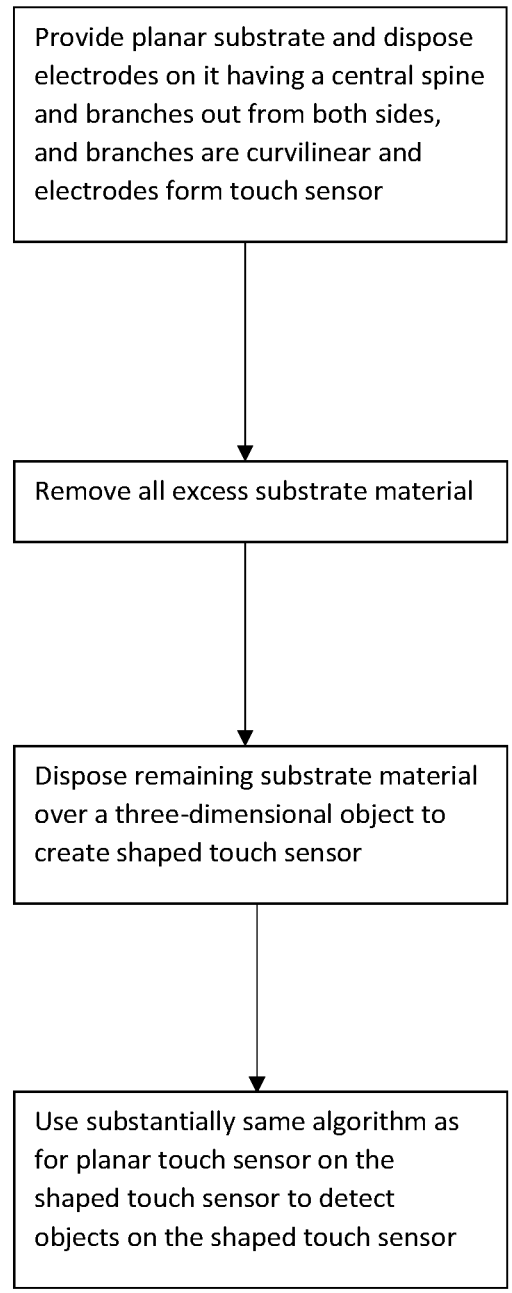
FIG. 10 is a flowchart showing steps of a first embodiment of the invention.

As a summary of the first embodiment of the invention, the present invention may be described in FIG. 10 as a flowchart that illustrates a method for operating a three-dimensional touch sensor. The method comprises the steps of providing a planar substrate material, disposing a plurality of electrodes on a first portion of the planar substrate material, wherein the first portion may be comprised of a central linear spine, wherein a plurality of touch sensor branches may extend away from the central linear spine in opposite directions, wherein the plurality of touch sensor branches are curvilinear, and wherein the plurality of electrodes may form a touch sensor.

The next step may be to remove a second portion of the planar substrate material that does not contain any of the first portion. Then the first portion of the planar substrate material is disposed over a three-dimensional object such that the first portion conforms to a surface of the three-dimensional object such that there are no gaps through the first portion and the first portion forms the touch sensor having a plurality of columns and rows.

Finally, because the embodiments are designed to only require some offset voltages in order to be substantially the same detection and tracking algorithm as used on a planar touch sensor, the algorithm may be able to detect and/or track one or more objects on the first portion of the planar substrate material.

The method may also include forming a plurality of capacitance sensing nodes on the first portion of the planar substrate material, wherein the capacitance sensing nodes may be formed wherever the plurality of electrodes cross over each other to form the columns and the rows.

The capacitance sensing nodes may be spaced equidistantly on each of the rows, but different rows may have different spacing between the capacitance sensing nodes on each row.

The method may also include providing offsets in the detection and tracking algorithm to compensate for the different spacing between the capacitance sensing nodes.

It is noted that although the embodiments may enable the use of detection and tracking algorithm that is substantially unchanged from that used by a planar touch sensor, it may also be modified in order to achieve certain levels of performance.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A touch sensor, comprising:
   a substrate material;
   the substrate material has a shape that includes a central linear spine and a plurality of branches that extend away from the central linear spine in opposite directions;
   a plurality of electrodes is disposed on the central spine and branches;
   wherein at least some of the plurality of branches are curvilinear, and wherein the plurality of electrodes form a touch sensor.

2. The touch sensor of claim 1, comprising a plurality of capacitance sensing nodes on the substrate material, wherein the capacitance sensing nodes are formed where the plurality of electrodes cross over each other to form the columns and the rows.

3. The touch sensor of claim 2, further comprising a plurality of capacitance sensing nodes on the planar substrate material spaced equidistantly on each of the rows, wherein different rows have different spacing between the capacitance sensing nodes on each row.

4. The touch sensor of claim 1, wherein the substrate material is disposed over a three-dimensional object such that the substrate material conforms to a surface of the three-dimensional object such that the substrate material forms the touch sensor having a plurality of columns and rows.

5. The touch sensor of claim 1, wherein further comprising a buss electrical connection disposed on the central spine, wherein the buss electrical connection is connected to the capacitive measurement nodes disposed on the branches.

6. The touch sensor of claim 1, wherein the substrate material is oriented in a planar configuration.

7. A touch sensor, comprising:
   a substrate material;
   the substrate material includes a central linear spine and a plurality of branches that extend away from the central linear spine in opposite directions;
   a plurality of electrodes is disposed on the substrate material;
   wherein at least some of the plurality of branches are linear, and wherein the plurality of electrodes form a touch sensor.

8. The touch sensor of claim 7, further comprising a plurality of capacitance sensing nodes on the substrate material, wherein at least one of the capacitance sensing nodes is formed where the plurality of electrodes cross over each other to form the columns and the rows.

9. The touch sensor of claim 8, further comprising a buss electrical connection disposed on the central spine, wherein the buss electrical connection is connected to the capacitive measurement nodes disposed on the branches.

10. The touch sensor of claim 7, wherein the substrate material is disposed over a three-dimensional object such that the substrate material conforms to a surface of the three-dimensional object such that there are no gaps through the substrate material and the substrate material forms the touch sensor having a plurality of columns and rows.

11. The touch sensor of claim 7, further comprising a buss electrical connection disposed on the central spine, wherein the buss electrical connection is connected to the capacitive measurement nodes disposed on the branches.

12. A three-dimensional touch sensor, comprising:
   a substrate material;
   the substrate material includes a central linear spine and a plurality of branches that extend away from the central linear spine in opposite directions;
   wherein the plurality of branches are linear;
   a plurality of electrodes is disposed on the substrate material;
   the substrate material is disposed over a three-dimensional object such that the central spine and the branches of the substrate material conform to a surface of the three-dimensional object while providing substantial gaps through the substrate material and the substrate material forms the touch sensor having a plurality of rows and columns that are perpendicular to each other.

13. A The three-dimensional touch sensor of claim 12, further comprising a plurality of capacitance sensing nodes on the substrate material, wherein at least some of the capacitance sensing nodes are formed where the plurality of electrodes cross over each other to form the columns and the rows.

14. A The three-dimensional touch sensor of claim 12, further comprising a buss electrical connection disposed on the central spine, wherein the buss electrical connection is connected to capacitive measurement nodes disposed on the branches.

15. A three-dimensional touch sensor, comprising:
a substrate material;
the substrate material includes two sets of interdigitated fingers that extend towards each other from two spines, wherein the two sets of interdigitated fingers are linear;
a plurality of electrodes is disposed on the substrate material;
the substrate material is disposed over a three-dimensional object such that the central spine and the branches of the substrate material conform to a surface of the three-dimensional object while providing no substantial gaps through the substrate material and the substrate material forms the touch sensor having a plurality of rows and columns that are perpendicular to each other.

16. The three-dimensional touch sensor of claim 15, further comprising a plurality of capacitance sensing nodes on the substrate material, wherein at least some of the capacitance sensing nodes are formed where the plurality of electrodes cross over each other to form the columns and the rows.

17. The three-dimensional touch sensor of claim 16, further comprising a buss electrical connection disposed on the central spine, wherein the buss electrical connection is connected to the capacitive sensing nodes disposed on the branches.

18. A three-dimensional touch sensor, comprising:
a substrate material;
wherein the substrate material includes a spine that extends at least partway around a circular outer edge, wherein at least some of a plurality of fingers are parallel and extend outwards from the spine, wherein at least some of the plurality of fingers are linear,
a plurality of electrodes is disposed on the substrate material;
wherein the plurality of electrodes form a touch sensor having a plurality of rows and columns that are perpendicular to each other; and
the central spine and the branches are disposed over a three-dimensional object such that the substrate material conforms to a surface of the three-dimensional object.

19. The three-dimensional touch sensor of claim 18, further comprising a plurality of capacitance sensing nodes on the substrate material, wherein at least some of the capacitance sensing nodes are formed where the plurality of electrodes cross over each other to form the columns and the rows.

20. The three-dimensional touch sensor of claim 19 further comprising a buss electrical connection disposed on the central spine, wherein the buss electrical connection is connected to the capacitive sensing nodes disposed on the branches.

* * * * *